United States Patent
Cooney et al.

(10) Patent No.: US 6,779,837 B1
(45) Date of Patent: Aug. 24, 2004

(54) MESH SIDE SHIELD FOR VEHICLE SUNROOF

(75) Inventors: Daniel Cooney, Livonia, MI (US); Troy Allan, Howell, MI (US); David Newkirk, Sterling, MI (US); James Nicholson, Jr., Dearborn, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/678,711

(22) Filed: Oct. 3, 2003

(51) Int. Cl.$^7$ ................................................. B60J 7/22
(52) U.S. Cl. ...................................................... 296/217
(58) Field of Search ........................................ 296/217

(56) References Cited

U.S. PATENT DOCUMENTS

| | | | | |
|---|---|---|---|---|
| 1,935,993 A | * | 11/1933 | Wilhelm | 296/26.05 |
| 4,702,518 A | * | 10/1987 | Paerisch et al. | 296/217 |
| 6,457,769 B2 | * | 10/2002 | Hertel et al. | 296/217 |
| 2003/0168892 A1 | * | 9/2003 | Bohm et al. | 296/217 |

FOREIGN PATENT DOCUMENTS

| | | | | |
|---|---|---|---|---|
| DE | 3308065 | * | 9/1983 | 296/217 |
| JP | 2001-180285 | * | 7/2003 | |

* cited by examiner

*Primary Examiner*—Dennis H. Pedder
(74) *Attorney, Agent, or Firm*—Carlson, Gaskey & Olds

(57) ABSTRACT

A vehicle sunroof is provided with side shields formed of a mesh material. The side shields prevent inadvertent pinching of an occupant's hand by the mechanism for driving the sunroof panel to move, when the panel is in its vent position. The mesh material allows flow of air into the cab of the vehicle when the panel is in the vent position. The side shield is also formed to have a shape such that the rear end of the side shield extends for a greater length then does the forward end. In this way, the shape of the side shield better matches the pivoting movement of the panel, and there is less unnecessary material which must be accommodated when the sunroof is in its closed position. Also, the side shield has a better visual appearance then does the prior art side shield.

11 Claims, 4 Drawing Sheets

MESH SIDE SHIELD FOR VEHICLE SUNROOF

BACKGROUND OF THE INVENTION

This invention relates to a vehicle sunroof side shield which is formed of a mesh material, and which has a shape tailored to accommodate pivotal movement of the sunroof panel.

Vehicles are often provided with a sunroof. As known, the sunroof has a panel which pivots within an opening in the vehicle roof, from a "closed" position to a "vent" position. The sunroof panel is also capable of moving rearwardly to an "open" position where the roof opening is entirely open. A drive mechanism is received at each lateral extent of the sunroof to drive the panel to pivot, and to retract the panel to its "open" position. "Sunroof" as used in this application includes any panel mounted in a vehicle roof opening, and moveable relative to the opening.

This drive mechanism includes various moving parts. These moving parts are nominally accessible to occupants of the vehicle interior. There has been concern about the vehicle occupant's being "pinched" by these moving parts should they inadvertently move their hands into the area of the drive mechanism.

Thus, prior art sunroofs have sometimes included side shields. The side shields block access to the moving parts from the interior of the vehicle. The side shield of the prior art has been a heavy rubber corrugated member with a generally rectangular shape. The rectangular corrugated rubber member is attached to a pivoting bar, which moves with the panel. The pivoting bar pivots the panel between the vent and closed position.

The corrugated rubber side shields have been somewhat undesirable in that they are unsightly. Moreover, the corrugated rubber blocks airflow into the vehicle cab; defeating the main reason for the "vent position." The rectangular shape of the side shield also includes unnecessary additional material.

SUMMARY OF THE INVENTION

In a disclosed embodiment of this invention, a sunroof side shield is formed from a mesh material. "Mesh" as utilized in this application is defined as a material wherein a large percentage of its cross-sectional area is open and allows the flow of air. A "mesh" material is typically relatively thin, and less than 0.1 mm thick. In the most preferred mesh as utilized for this invention, the mesh is 0.3 mm thick. Moreover, a mesh allows airflow generally across its entire cross-sectional area, through openings between its fibers. That is, something more than a thick, air impermeable material having a few spaced holes. A mesh fabric available from a company called Roekona of Germany is suitable for this purpose. A copy of the material specifications will be included in the file history of this application. However, other mesh materials would be suitable. Also, while a mesh material is most preferred, other fabrics that allow air flow may be utilized within the scope of this invention. That is, either woven or non-woven fabrics that are not impervious to airflow may be utilized within the broader teachings of this invention.

In another feature of this invention, the side shield could be said to be generally triangular. The shape is not an actual triangle, however, the forward end will be of a length that is much less than the rear end. This shape better matches the upward pivoted position of the panel in the "vent" position. Thus, in the "closed" position there is less material which must be accommodated.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
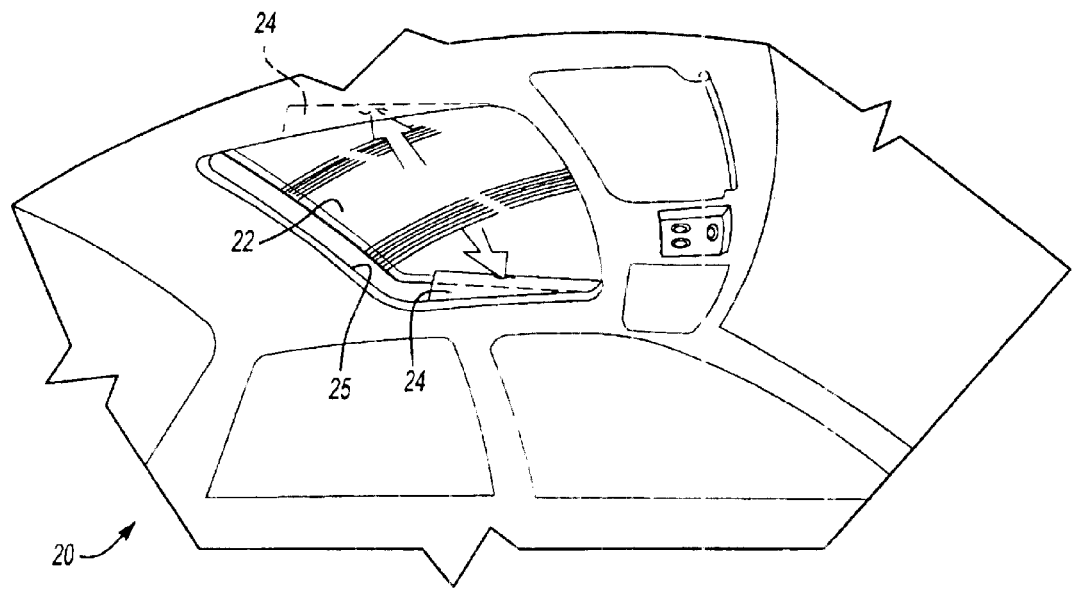
FIG. 1 shows a prior art vehicle.

FIG. 1 shows a known vehicle 20 incorporating a sunroof panel 22 having side shields 24. As is known, the sunroof panel 22 pivots to the illustrated "vent" position, and downwardly to a "closed" position. In the "closed position" the sunroof panel 22 seals against an opening 25 in the roof of the vehicle 20. In the vent position, as can be appreciated, air can enter the vehicle through the opening 25, and around the rear of the sunroof panel 22. Side shields 24 are heavy corrugated rubber members which block flow of air into the vehicle along the sides. The purpose of the "vent" position is to allow the airflow into the vehicle. Thus, the heavy rubber corrugated side shields, which block airflow, have some undesirable characteristics. However, the side shields do prevent occupants of the vehicle from inadvertently having their fingers pinched by the moving parts which drive the sunroof panel 22 between the vent, open and closed position.

Figure 2:
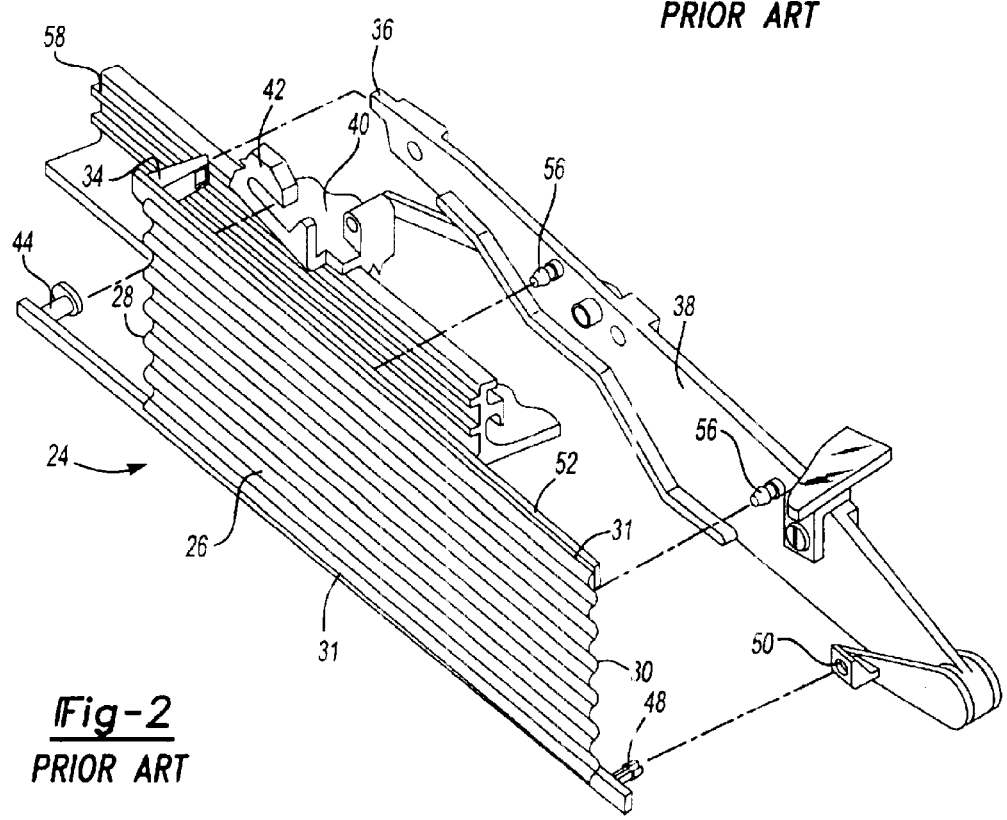
FIG. 2 shows the prior art side shield.

As shown in FIG. 2, the side shield 24 has corrugations 26, and a rear end 28 which is approximately of the same length as forward end 30. Top and bottom extents 31 connect the rear end 28 to the forward end 30. The use of the rectangular side shield 24 results in additional unused material, which must be accommodated when the window is in its "closed" position. Further, the use of this heavy rubber member blocks airflow as explained above, and is also somewhat unsightly.

As further shown in FIG. 2, the side shields has a clip member 34 which clips onto a rear pin 36 from a pivoting bar 38. Pivoting bar 38 serves to pivot the sunroof panel 22 between its "vent" and "closed" positions. As is also well known, the sunroof panel 22 can also be moved rearwardly out of the opening 25 to a fully "open" position. The mechanisms and connections for driving the panel 22 between these positions are as known in the art, and form no portion of this invention.

A follower 40 is driven by a drive mechanism to move the pivoting bar 38 and the glass panel, as is known. A slot 42 on the follower 40 receives a pin 44 from a lower frame member 46 of the side shield 24. A forward pin 48 is received in an opening 50 which also moves with the pivoting bar 38. An upper frame 52 carries sockets (not shown) which are received on pins 56 associated with the pivoting bar 38. A rail 58 guides the sunroof panel 22 and the drive mechanism for movement.

Figure 3:
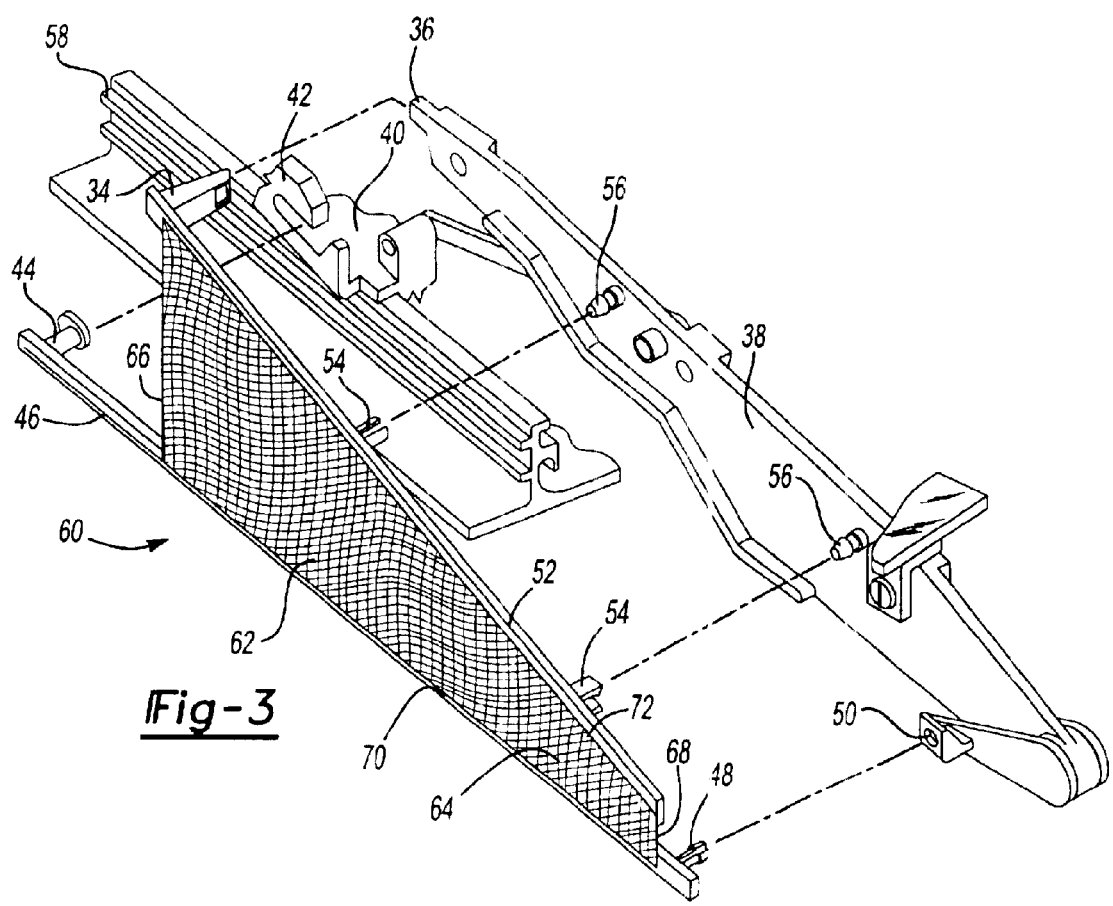
FIG. 3 shows the inventive side shield in an exploded position.
Figure 4:
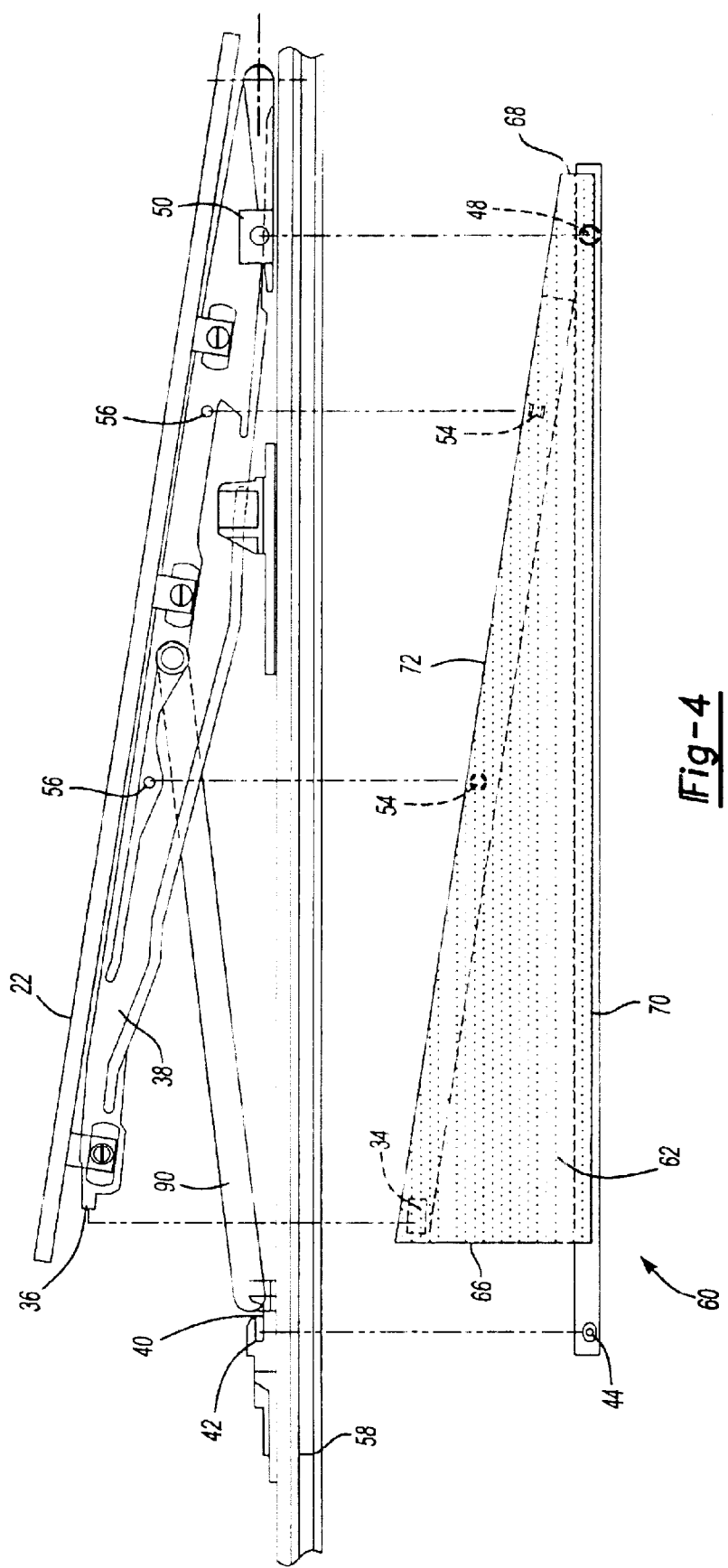
FIG. 4 shows the inventive side shield removed from a drive
Figure 5:
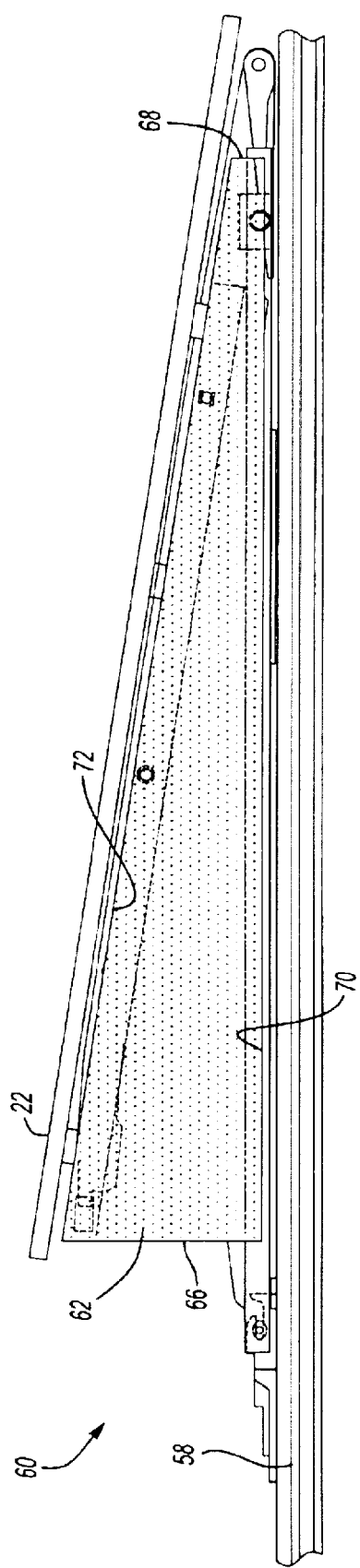
FIG. 5 shows the side shield in the "vent" position.
Figure 6:
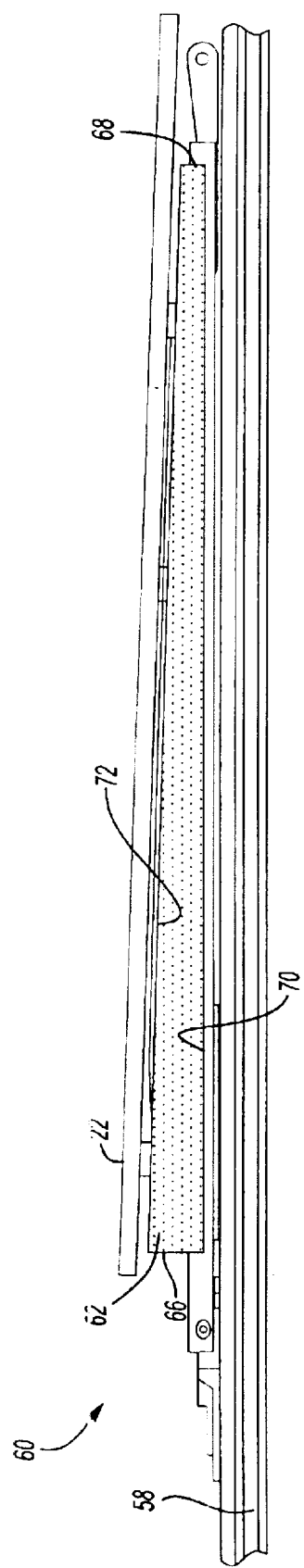
FIG. 6 shows the side shield in the "closed" position.

An inventive side shield is shown at 60 in FIG. 3. As shown, the surface 62 of the side shield 60 have a mesh construction as shown at 64. In FIGS. 4–6 the material is shown more closed than in FIG. 3. It should be understood this is only to simplify FIGS. 4–6. "Mesh" as utilized in the context of this application means that much of the cross-sectional area of the surface 62 is open, and allows flow of air. As shown, the rear end 66 has a greater length than the forward end 68. A lower surface 70 is generally straight, while the upper surface 72 extends at an angle to connect the rear end 66 to the forward end 68. While it is clear from this figure that the surface 62 is not actually triangular, it more closely approximates the movement of the sunroof panel 22 to the vent position than does the prior art. In this manner, there is less wasted material which must be accommodated in the various positions of the panel 22 then was the case in the prior art. The side shield 60 may be attached to the pivoting bar 38 and follower 40 in a manner not unlike that of the prior art shown in FIG. 2. Notably, the sockets 54 which are not shown in FIG. 2 are visible in FIG. 3.

As shown in FIG. 4, the drive link 90 which connects the follower 40 to the pivoting bar 38 assists in driving the panel 22 to its "vent position." The cross-sectional shape of surface 62 is closely matched to the distance between the sunroof panel 22 and the rail 58 in the vent position, such that there is little unnecessary material.

As shown in FIG. 5, the side shield 60 has now been attached to the drive mechanism and panel 22 is in the "vent position." As can be appreciated, the cross-sectional shape of surface 62, and in particular the small forward end 68, provides adequate material to prevent inadvertent movement of occupant's fingers into an area where the drive mechanism is located. It should be appreciated that the mesh of the cross-sectional area of surface 62 allows the flow of air into the vehicle cab in a largely unrestricted way.

When the window is pivoted to its "closed" position as is shown in FIG. 6, there is less material which need be accommodated then was the case in the prior art. In the prior art, due to the rectangular shape of the side shield, it should be appreciated that there was a great deal more unnecessary material at the forward end when the panel is in its "vent" position. All of this additional material needed to be accommodated when the vehicle is in its "closed" position, and that was undesirable.

It should be appreciated that FIGS. 2–5 all show the side shields at a laterally inner position relative to the drive mechanisms. That is, an occupant of the vehicle 20 (see FIG. 1) who reaches a hand through roof opening 25 will encounter the side shield prior to the drive mechanism. Also, although FIGS. 2–6 only show a single side shield, a worker in the art will recognize that two side shields will preferably be used, as shown in FIG. 1.

The preferred embodiment of this invention has been disclosed, however, a worker of ordinary skill in the art would recognize that certain modifications would come within the scope of this invention. For that reasons the following claims should be studies to determine the true scope and content of this invention.

What is claimed is:

1. A vehicle sunroof comprising:

a panel moveable between a closed position and a vent position, said panel being driven to pivot between said closed and said vent positions, said vent position being defined by driving said panel to generally pivot about a forward end;

a drive mechanism for driving said panel to pivot between said vent and said closed positions; and a side shield for preventing access to said drive mechanism, said side shield being formed of a material allowing air passage generally over a full extent of an exposed cross-sectional area, said side shield having a rear edge with a greater length that a front edge, and said side shield being attached to move with said panel between said vent and closed positions.

2. The vehicle sunroof as set forth in claim 1, wherein said side shield is attached to move with a pivot bar, said pivot bar being a portion of said drive mechanism.

3. The vehicle sunroof as set forth in claim 1, wherein said side shield is positioned laterally inwardly of said drive mechanism.

4. The vehicle sunroof as set forth in claim 1, including side shields and drive mechanisms associated with each of two opposed lateral sides of said panel, with both said side shields being positioned laterally inwardly of an associated one of said drive mechanisms.

5. The vehicle sunroof as set forth in claim 1, wherein said material is a mesh material.

6. A vehicle sunroof comprising:

a panel moveable between a closed position and a vent position, said panel being driven to pivot between said closed and said vent positions, said vent position being defined by driving said panel to generally pivot about a forward end;

a drive mechanism for driving said panel to pivot between said vent and said closed positions; and a side shield for preventing access to said drive mechanism, said side shield having a rear dimension associated with a rear end of said panel which pivots to move to said vent position, said side shield having a forward dimension associated with said forward end, said forward dimension being smaller than said rear dimension, said side shield being fixed to move with said panel between said vent and closed positions, and said side shield being formed of a mesh material.

7. The vehicle sunroof as set forth in claim 6, wherein said side shield is attached to a pivot bar, said pivot bar being a portion of said drive mechanism.

8. The vehicle sunroof as set forth in claim 6, wherein said side shield is positioned laterally inwardly of said drive mechanism.

9. The vehicle sunroof as set forth in claim 6, including side shields and drive mechanisms associated with each of two opposed lateral sides of said panel, with both said side shields being positioned laterally inwardly of an associated one of said drive mechanisms.

10. The vehicle sunroof as set forth in claim 7, wherein said side shield has an upper edge attached to said pivot bar, and a lower edge attached to a lower frame structure, said pivot bar pivoting as said panel moves between said closed and vent positions such that said upper edge of said side shield moves during said pivoting movement with said lower edge of said side shield remaining relatively stationary, and such that said side shield covers a space between said pivot bar and said lower frame structure when said panel has moved to said vent position.

11. The vehicle sunroof as set forth in claim 2, wherein said side shield has an upper edge attached to said pivot bar, and a lower edge attached to a lower frame structure, said pivot bar pivoting as said panel moves between said closed and vent positions such that said upper edge of said side shield moves during said pivoting movement with said lower edge of said side shield remaining relatively stationary, and such that said side shield covers a space between said pivot bar and said lower frame structure when said panel has moved to said vent position.

* * * * *